No. 829,688. PATENTED AUG. 28, 1906.
J. BEAN.
ANIMAL TRAP.
APPLICATION FILED MAY 19, 1906.
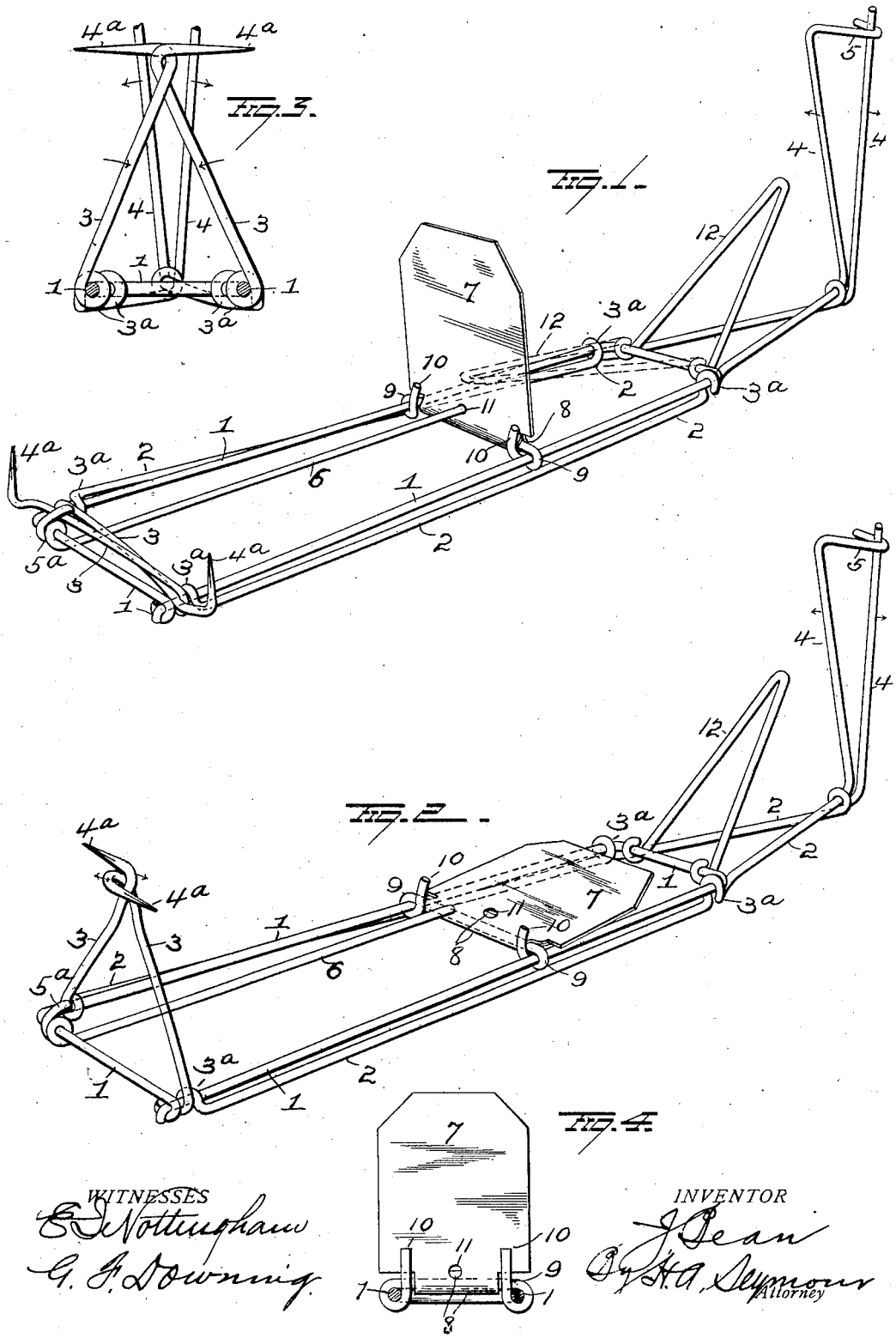

UNITED STATES PATENT OFFICE.

JOHN BEAN, OF LOS GATOS, CALIFORNIA.

ANIMAL-TRAP.

No. 829,688.　　　　Specification of Letters Patent.　　　Patented Aug. 28, 1906.

Application filed May 19, 1906. Serial No. 317,763.

*To all whom it may concern:*

Be it known that I, JOHN BEAN, a resident of Los Gatos, in the county of Santa Clara and State of California, have invented certain new and useful Improvements in Animal-Traps; and I do hereby declare the following to be a full, clear, and exact description of the invention, such as will enable others skilled in the art to which it appertains to make and use the same.

My invention relates to improvements in animal-traps, and more particularly to traps for the capture of animals that burrow in the ground—such as gophers, moles, prairie-dogs, and the like—the object of the invention being to provide a trap which may be set without danger to the operator, and without bringing the hands into contact with the dangerous parts of the trap, and hence prevent the leaving of any scent on the parts to warn the animal of its danger.

In setting most traps, it is necessary to handle the jaws and other parts of the trap, thus leaving the scent of the hands upon it, and as a consequence animals of keen scent will avoid the trap; but the jaws of my trap are never handled, because they are set by the arms at the rear either before or after placing in the ground. Another difficulty with other traps is that it requires great care to prevent springing the trap when placing it in the ground, and this necessary precaution precludes the possibility of sufficiently embedding the trap to hide it from view, and this leaving exposed is fatal to the efficiency of the trap.

With these and other objects in view the invention consists in certain novel features of construction and combinations and arrangements of parts, as will be more fully hereinafter described, and pointed out in the claims.

In the accompanying drawings, Figure 1 is a perspective view illustrating my improved trap set ready for placing in the ground and having the guard in dotted lines in position to prevent accidental springing of the trap. Fig. 2 is a similar view showing the trap sprung, and Figs. 3 and 4 are views of details of construction.

1 represents an oblong wire frame, preferably slightly narrower at one end than at the other and serving as a support for the movable parts of the trap, as will now be explained. On the long side wires of the frame 1 spring-wires 2 are mounted and are coiled, as shown at $3^a$, about the wire frame 1 at or near the ends of the latter. The ends of these wires 2 at the wider end of frame 1 are bent, forming jaws 3, having sharp prongs $4^a$ at their free ends, and the opposite ends of the wires 2 at the narrower end of frame 1 incline toward each other in approximately the same horizontal plane as the frame. One of these wires is coiled about the other, and both are bent at right angles, forming arms 4. One of these arms 4 is made with a hook 5 at its free end to receive the other arm 4 when the wires are under spring tension, as will be hereinafter explained.

The jaws 3 when in horizontal set position are crossed, and a short end $5^a$ of a trigger 6 extends over the upper jaw 3 to hold both jaws in set position. This trigger 6 comprises a wire bent around the end cross-wire of frame 1, and its long arm is held by a hinged trencher 7. The trencher is made in the form of a metal plate having a tongue 8 at its lower edge bent around a cross-wire 9 on frame 1 to hinge the trencher thereto, the ends of the cross-wire 9 being bent up to form stops 10 to limit the hinged movement of the trencher in one direction. An opening 11 is provided in the trencher 7 to receive the trigger 6, and the tongue portion 8 of the trencher partially or wholly closes the opening 11 at the rear face of the trencher to permit the trigger to project into the opening but the width or thickness of the plate forming the trencher, and thus permit a slight movement of the latter to release the trigger.

At the narrower end of frame 1 a guard 12 is hinged and consists of a wire bent into the form of a narrow bail and adapted to be moved down against the trencher to hold the latter against accidental movement and prevent the accidental springing of the trap while it is being handled and placed in position in the ground.

The operation of my improvements is as follows: To set the trap, the trigger 6 is first elevated so that the short arm $5^a$ thereof is moved out of the way to permit the jaws to descend and lie in a position to be engaged and held by the trigger. The arms 4 are then unhooked and lowered, care being exercised to move the arm carrying the under jaw 3 down first, and then the upper or overlapping jaw is moved down and across the first jaw by its arm 4. The trencher 7 is then moved to a vertical position and trigger 6 inserted in the hole 11 in the trencher, and the guard 12 is brought down against the trencher to prevent any movement thereof to release the trigger. The arms 4 are then forced upward and together and hooked, as shown, which puts the jaws 3 under high spring tension, ready to fly up and together when the trigger is released. While the trencher is held by the guard, the trap may be placed in position in the ground and handled with perfect safety, as the jaws cannot spring while the trencher is held by the guard. When the trap is in position, the guard is swung back out of the way, and the slightest movement of the trencher by the animal will release the trigger, and the jaws will fly up together and grasp the animal. It will thus be seen that my improved trap can be set without any danger to the operator and without the necessity of handling the jaws to leave any scent thereon, which would warn the animal of its danger.

A great many slight changes might be made in the general form and arrangement of the parts described without departing from my invention, and hence I do not restrict myself to the precise details set forth, but consider myself at liberty to make such slight changes and alterations as fairly fall within the spirit and scope of my invention.

Having fully described my invention, what I claim as new, and desire to secure by Letters Patent, is—

1. In a trap, the combination of two jaws one overlapping and holding the other, a trigger holding the upper jaw, a trencher holding the trigger set, and means for putting the jaws under spring tension.

2. In a trap, the combination with a frame, of spring-wires movably mounted on the frame, jaws at one end of the wires, a trigger to hold the jaws set, a movable trencher to hold the trigger, and arms on the spring-wires twisting said wires to put the jaws under tension, and one arm bent forming a hook to receive and hold the other arm.

3. In a trap, the combination with a frame of spring-wires movably mounted on the frame, jaws at one end of the wires, arms at the other ends of the wires to put the jaws under tension after being set, a hinged trencher, a trigger holding the jaws set and held by the trencher, and a guard to hold the trencher against accidental movement while handling the trap.

4. In a trap, the combination with spring-jaws, of a trigger to hold the jaws in set position, a trencher to hold the trigger against movement to release the jaws, and a guard to engage and hold the trencher against accidental movement.

5. In a trap, the combination with a wire frame, of spring-jaws pivotally secured to the side wires of the frame, a trigger pivoted to an end wire of the frame to engage and hold the jaws set, a cross-wire on the frame, a hinged trencher thereon having an opening to receive and hold the trigger, and a guard on the end wire of the frame to engage the trencher and hold it against accidental movement.

In testimony whereof I have signed this specification in the presence of two subscribing witnesses.

JOHN BEAN.

Witnesses:
L. E. JOHNS,
W. PECK.